US009143176B2

(12) United States Patent
Wax et al.

(10) Patent No.: US 9,143,176 B2
(45) Date of Patent: Sep. 22, 2015

(54) METHOD AND SYSTEM FOR MULTIPATH FINGERPRINTING BY MAXIMUM DISCRIMINATION TECHNIQUES

(71) Applicants: Mati Wax, Haifa (IL); Ariel Yaffe, Ra'anana (IL)

(72) Inventors: Mati Wax, Haifa (IL); Ariel Yaffe, Ra'anana (IL)

(73) Assignee: WAVION, LTD., Yoqne'am-Illit, IL (US)

(*) Notice: Subject to any disclaimer, the term of this patent is extended or adjusted under 35 U.S.C. 154(b) by 0 days.

(21) Appl. No.: 14/247,513

(22) Filed: Apr. 8, 2014

(65) Prior Publication Data

US 2014/0301511 A1 Oct. 9, 2014

Related U.S. Application Data

(60) Provisional application No. 61/809,530, filed on Apr. 8, 2013.

(51) Int. Cl.
| | |
|---|---|
| *H04B 7/02* | (2006.01) |
| *H04M 1/00* | (2006.01) |
| *H04B 1/10* | (2006.01) |
| *G01S 5/02* | (2010.01) |
| *H04W 64/00* | (2009.01) |

(52) U.S. Cl.
CPC ............ *H04B 1/1081* (2013.01); *G01S 5/0215* (2013.01); *G01S 5/0252* (2013.01); *G01S 5/0273* (2013.01); *H04W 64/00* (2013.01)

(58) Field of Classification Search
CPC ..... H04W 64/00; H04W 4/02; H04W 64/003; G01S 5/0263; G01S 5/0252; G01S 5/02; G01S 5/22; H04L 2025/03796
USPC ................................ 375/267, 348; 455/456.1
See application file for complete search history.

(56) References Cited

U.S. PATENT DOCUMENTS

| | | | |
|---|---|---|---|
| 6,026,304 A | 2/2000 | Hilsenrath | |
| 6,064,339 A | 5/2000 | Wax | |
| 6,112,095 A | 8/2000 | Wax | |
| 6,249,680 B1 | 6/2001 | Wax | |
| 7,313,402 B1* | 12/2007 | Rahman et al. | ............ 455/456.1 |
| 2006/0052115 A1* | 3/2006 | Khushu | ..................... 455/456.3 |
| 2011/0077030 A1* | 3/2011 | Wigren et al. | ............. 455/456.5 |
| 2013/0194135 A1* | 8/2013 | Farnham | ....................... 342/450 |
| 2013/0288704 A1* | 10/2013 | Wirola et al. | .............. 455/456.1 |

OTHER PUBLICATIONS

Bahl and Padmanabhan, "RADAR: an in-building RF-based user locationand tracking system", INFOCOM 2000, Nineteenth Annual Joint Conference of the IEEE Computer and Communications Societies. Proceedings. IEEE, 2000, vol. 2, pp. 775-784.
Wireless LAN Medium Access Control (MAC) and Phisical Layer (PHY) Specification, ANSI/IEEE 802.11, 1999 Edition.

* cited by examiner

*Primary Examiner* — Don N Vo
(74) *Attorney, Agent, or Firm* — Pearl Cohen Zedek Latzer Baratz LLP

(57) ABSTRACT

Discriminative methods for multipath fingerprinting, enabling single-site localization in rich multipath environments, are provided herein. In contrast to the existing descriptive method that uses only the data of each location for its fingerprint extraction, these methods use also the data of the other locations in the database, and leverage it to make the fingerprint as different as possible from the other fingerprints in the database. The performance of these methods, validated with both simulated and real data, is superior to the existing method, demonstrating localization accuracy of about 1 m in typical indoor environments.

16 Claims, 7 Drawing Sheets

METHOD AND SYSTEM FOR MULTIPATH FINGERPRINTING BY MAXIMUM DISCRIMINATION TECHNIQUES

CROSS-REFERENCE TO RELATED APPLICATIONS

This patent application claims the benefit of U.S. Provisional Patent Application No. 61/809,530, filed on Apr. 8, 2013, which is incorporated by reference herein in its entirety.

FIELD OF THE INVENTION

The present invention relates generally to the field of wireless communication systems and in particular to emitter localization in a multipath environment.

BACKGROUND OF THE INVENTION

In recent years, there has been a growing interest in location determination of emitters (e.g., transmitters) in urban canyons and in indoor venues where line of sight (LOS) conditions usually do not exist. In these cases, the propagation from the wireless emitter to the receiving antennas usually undergoes reflections from buildings and walls, referred to as multipath. Consequently, the multipath signals arriving at the receiving antennas may be very different from the LOS path. As a result, the classical position location techniques are not valid. Fingerprinting techniques have been developed to overcome this multipath problem.

Two types of fingerprinting techniques have been developed about the same time. The first is described by Wax et al. in U.S. Pat. Nos. 6,026,304, 6,064,339, 6,112,095, and 6,249,680, which are all incorporated herein by reference. This technique is based on using the multipath characteristics coherently received by a multiple-antenna base station (BS) as the location fingerprint. The other fingerprinting technique is described by Bahl and Padmanabhan in "RADAR: an in-building RF-based user location and tracking system", *INFOCOM 2000. Nineteenth Annual Joint Conference of the IEEE Computer and Communications Societies. Proceedings. IEEE,* 2000, vol. 2, pp. 775-784. This technique is based on using the received signal strength (RSS) obtained at several BSs as the location fingerprint.

The basic premise of multipath fingerprinting is that, in rich multipath environments, the multipath characteristics of the signals impinging on an antenna array—the directions-of-arrival and the differential-delays of the impinging multipath reflections—provide a unique "fingerprint" of the emitter location. In other words, there exists a "one-to-one" correspondence between the location of the emitter and the characteristics of the multipath signals emitting from this location and impinging on antenna array.

Fingerprinting algorithms are based on the premise that there is a one-to-one correspondence between the emitter location and the signal characteristics of the received multipath signals, i.e., that a fingerprint (or signature) can be extracted from the signal and serve as a unique identifier of the location. The localization problem is casted as a pattern recognition problem, namely, a database of fingerprints (or a "fingerprints database") is pre-collected in the desired area to be covered, and the location is determined by comparing the extracted fingerprint to the fingerprint database.

A key element in multipath fingerprinting is the fingerprint extraction method. Some extraction methods known in the art can be regarded as "descriptive methods". One such descriptive method, referred to as Signal-Subspace Projection (SSP), is based on a projecting the received data on a low-dimensional subspace wherein the multipath signals reside, referred to as the signal-subspace. This projection matrix provides an effective description of the multipath characteristics of each location. Yet, the fact that it captures only the description of each location, without taking into consideration the description of the other locations in the database, is a deficiency.

SUMMARY OF THE INVENTION

In order to address the aforementioned deficiency of the prior art, it would be advantageous to extract the fingerprint of a specified location using not only data from the specified location, but also the data from the other locations in the database, and leverage it to make the fingerprint as different as possible with respect to the other fingerprints in the database.

Two non-limiting embodiments of the present invention for discriminative fingerprint extraction methods are provided herein. In one embodiment, referred herein to as Maximum Discrimination Projection (MDP), the most discriminative projection matrix is extracted. In the other embodiment, referred herein to as Maximum Discrimination Transformation (MDT), the most discriminative transformation matrix is extracted. The fact that the MDT method does not impose a projection structure, but allows an arbitrarily structured transformation, is leveraged to increase its discriminative power over that of the MDP method.

Since the discriminative methods involve a matrix inversion, which tends to be sensitive to "noise" in the data, some embodiments of the invention, referred to as diagonal loading or regularization are used to remedy the sensitivity.

The matching of the extracted fingerprint with the fingerprints stored in the database may be carried out by the conventional method, referred to, with some abuse of terminology, as the Nearest Neighbor (NN) matching, as well as by the Similarity Profile (SP) matching known in the art.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
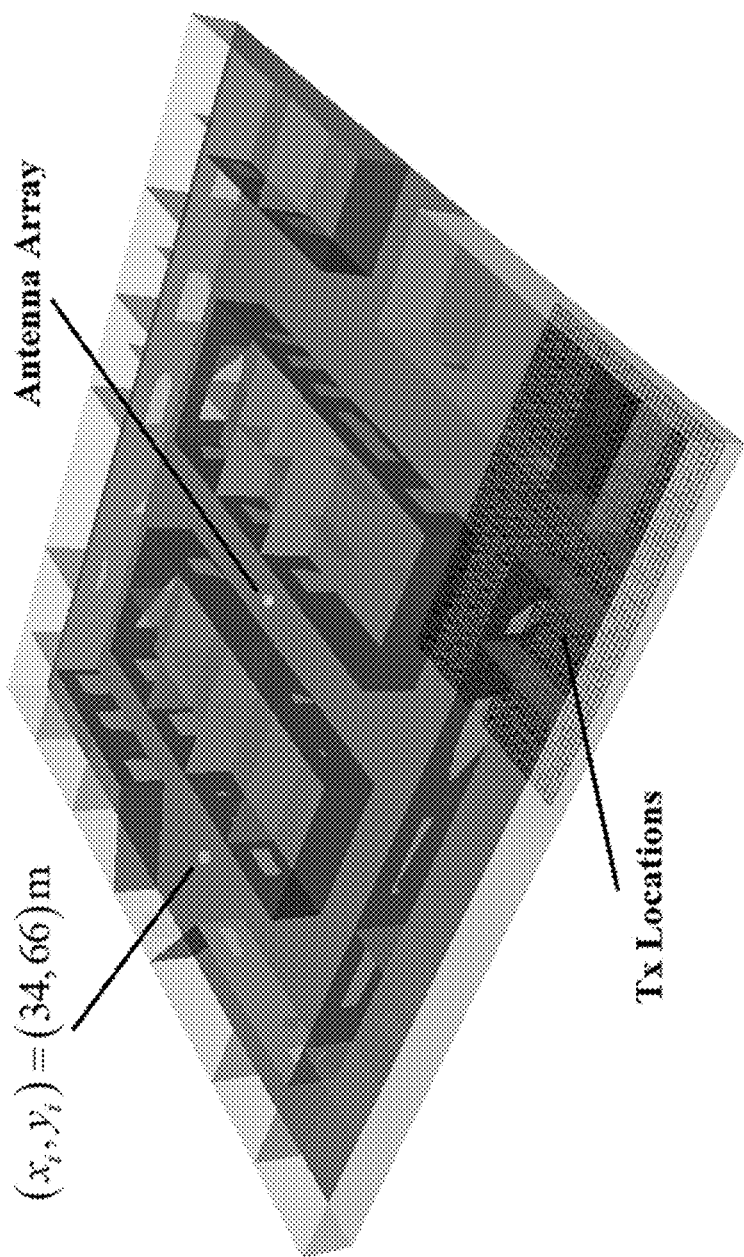
FIG. 1 is a high level block diagram illustrating an environment of a system according to embodiments of the present invention.

The drawings together with the following detailed description make the embodiments of the invention apparent to those skilled in the art.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before the embodiments of the invention are explained in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

The present invention, in embodiments thereof, may enable a base station or an access point to estimate the location of user equipment (UE) in case of long term evolution (LTE) protocol and the like or a station, in case of Wi-Fi (IEEE 802.11 family standard). It is understood that other implementations beyond wireless communication may exist.

Following is a mathematical formulation of the problem to be solved. It is assumed that the localization sought after is of an emitter transmitting a wideband signal s(t), centered at frequency $\omega_c = 2\pi f_c$, using an antenna array composed of p antennas with arbitrary locations and arbitrary directional characteristics. It is further assumed that the signal is impinging on the antenna array through q reflections with directions-of-arrival $\theta_1, \ldots, \theta_q$ and differential-delays $\tau_1, \ldots, \tau_q$. The outputs of the antenna array are sampled simultaneously at N times ("taps"), with an interval of D=1/BW seconds, where BW is a signal bandwidth. That is, each antenna is sampled at times (t=lD), l=0, . . . , N−1. The collection of these pN samples is referred to as a "snapshot".

It is assumed that the bandwidth of the signal s(t) is small compared to the size of the antenna array, i.e., that the propagation delays across the array are much smaller than the inverse bandwidth of the signal, so that the narrow-band array representation is applicable. This assumption is definitely valid for the bandwidth and antenna array size in modern communication techniques such as Wi-Fi and LTE.

In a case that the antenna array is sampled M times $\{t_m\}$, m=1, . . . , M, forming M snapshots, it would be possible to make the following further assumptions:

A.1 The signal s(t) is identical for all snapshots.
A.2 The directions-of-arrival and the differential-delays of the multipath are identical for all the M snapshots.
A.3 The multipath propagation coefficients are fixed for the duration of a snapshot, but may vary from snapshot to snapshot.
A.4 The noise samples $n_i(t_m+lD)$; l=0, . . . , N−1; m=1, . . . , M; i=1, . . . , p are i.i.d zero mean random variables with an unknown variance $\sigma^2$.

A.1 is valid for most modern wireless communication systems, such as Wi-Fi, since these communication systems have a repeatable signal part for synchronization and channel estimation purposes. Consequently, the sampling times can be confined to this repeatable signal part, using the synchronization capabilities of the receiver. 0 is valid provided that the M snapshots are sampled in a close proximity of each other and hence capture the same physical environment, i.e., the same directions-of-arrival and differential-delays. A.3 is a valid assumption since the time it takes for an indoor channel to change significantly is of the order of milliseconds, whereas the sampling duration of a snapshot D(N−1) is of the order of microseconds. Yet, since the time between the snapshots is of the order of milliseconds, any slight emitter movement or channel variations may vary the propagation coefficients from snapshot to snapshot.

Using a complex envelope representation, the l-th sample of the i-th sensor can be expressed as:

$$x_i(t+lD) = \sum_{k=1}^{q} \gamma_k(t) a_i(\theta_k) s(t+lD-\tau_k) e^{-j\omega_c \tau_i(\theta_k)} + n_i(t+lD) \quad (1)$$

where s(t) is the complex envelope of the signal, $\tau_k$ is the differential-delay of the k-th reflection relative to some reference, $\tau_i(\theta_k)$ is the delay between the i-th antenna and the reference antenna, caused by the reflection from $\theta_k$, $a_i(\theta_k)$ is the amplitude response of the i-th sensor to a wavefront impinging from direction $\theta_k$, $\gamma_k(t)$ is the complex propagation coefficient representing the phase shift and attenuation of the k-th reflection, $n_i(t)$ is the additive noise at the i-th antenna.

Using vector notation, Equation (1) can be written as follows:

$$x_i(t) = A_i \gamma(t) + n_i(t), i=1, \ldots, p \quad (2)$$

where $x_i(t)$ and $n_i(t)$ are the N×1 vectors $$x_i(t) = [x_i(t), x_i(t+D), \ldots, x_i(t+(N-1)D)]^T \quad (3)$$

$$n_i(t) = [n_i(t), n_i(t+D), \ldots, n_i(t+(N-1)D)]^T \quad (4)$$

$\gamma(t)$ is the q×1 vector $$\gamma(t) = [\gamma_1(t), \ldots, \gamma_q(t)]^T \quad (5)$$

and $A_i$ is the N×q matrix $$A_i = [a_i(\theta_1) e^{-j\omega_c \tau_i(\theta_1)} s(t-\tau_1), \ldots, a_i(\theta_q) e^{-j\omega_c \tau_i(\theta_q)} s(t-\tau_q)] \quad (6)$$

with $s(t-\tau_i)$ being the N×1 vector $$s(t-\tau_i) = [s(t-\tau_i), \ldots, s(t+(N-1)D-\tau_i)]^T \quad (7)$$

Combining the $x_i(t)$ vectors (i=1, . . . , p) into a "snapshot" vector x(t), (2) may be rewritten as:

$$x(t) = A\gamma(t) + n(t) \quad (8)$$

where x(t) and n(t) are the pN×1 vectors $$x(t) = [x_1^T(t), \ldots, x_p^T(t)]^T \quad (9)$$

$$n(t) = [n_1^T(t), \ldots, n_p^T(t)]^T \quad (10)$$

and A is the pN×q matrix $$A = [a(\theta_1) \otimes s(t-\tau_1), \ldots, a(\theta_q) \otimes s(t-\tau_q)] \quad (11)$$

with $\otimes$ denoting the Kronecker product, and $a(\theta_k)$ is the steering vector of the array towards direction $\theta_k$, given by:

$$a(\theta_k) = [a_1(\theta_k) e^{-j\omega_c \tau_1(\theta_k)}, \ldots, a_p(\theta_k) e^{-j\omega_c \tau_p(\theta_k)}]^T \quad (12)$$

It should be noted that Equation (8), ignoring the noise term, implies that $\{x(t_i)\}_{i=1}^{M}$ are confined to the subspace spanned by the columns of the matrix A. Note also that the matrix A captures all the direction-of-arrival and the differential-delay information of the multipath reflections. The column-span of A will be referred to as the signal subspace. The localization problem can be formulated as follows: estimate the emitter's location based on the signals $\{x(t_i)\}_{i=1}^{M}$ received by the antenna array.

Multipath Fingerprinting may represent the localization problem as a pattern recognition problem. First, in an off-line phase, fingerprints capturing the multipath signals impinging on the antenna array are extracted for every location in the desired coverage area, and stored in a database. Then, in the on-line phase, the multipath fingerprint of the emitter to be localized is extracted from the antenna array and matched to the fingerprints stored in the database. The location whose fingerprint best matches the extracted fingerprint is selected as the emitter location.

It is assumed herein that a "sufficient statistic" for the fingerprint extraction is the pN×pN spatial-temporal covariance matrix of the antenna array, given by:

$$\hat{R} = \frac{1}{M} \sum_{m=1}^{M} x(t_m) x^H(t_m) \qquad (13)$$

Care must be taken in the off-line phase of the database generation to insure proper spatial sampling and averaging—making sure that the spatial sampling captures different locations in the vicinity of each grid point, so that the averaged covariance fully spans the signal subspace of the multipath reflections.

A key element in multipath fingerprinting is the fingerprint extraction method. Three different methods for fingerprint extraction are provided herein.

For discussion purposes, the Signal-Subspace Projection (SSP) method is approached in a somewhat different way than as known in the art that will motivate and set the ground for the derivation of the discriminative methods in accordance with the embodiments of the present invention.

It is clear from the problem formulation that the multipath characteristics of a given location are captured by a low-dimensional signal subspace, spanned by the columns of the matrix A characterizing this location.

To estimate this subspace, let $P_i$ denote a $\hat{q}$-dimensional projection matrix, spanned by $W_i$, $$P_i = W_i W_i^H \qquad (14)$$

where $W_i$ is a $\hat{q}$-dimensional unitary matrix, i.e., $$W_i^H W_i = I \qquad (15)$$

For $P_i$ to estimate the projection onto the signal subspace of the i-th location, the projection of the spatial-temporal covariance matrix of the i-th location, denoted by it $\hat{R}_i$, on the subspace defined by $P_i$ should be maximized Mathematically, this can be expressed by the following maximization problem:

$$\max_{P_i} \; tr\{P_i \hat{R}_i\} \qquad (16)$$

Using (14) and the properties of the trace operator, it can be rewritten as:

$$\max_{W_i} \; tr\{W_i^H \hat{R}_i W_i\} \qquad (17)$$

This maximization problem has a solution well-known in the art, given by:

$$\hat{W}_i = \text{eigv}\{\hat{R}_i\} \qquad (18)$$

where eigv$\{\hat{R}_i\}$ denotes the "dominant" eigenvectors of $\hat{R}_i$. The decision on the number of the "dominant" eigenvectors to be included in $\hat{W}_i$ should be guided by the desire to capture only the high energy multipath reflections, and to discard the low energy multipath reflections, which are typically unstable and hence considered as "noise". To achieve this goal, the dimension of $\hat{W}_i$ is determined as the number of large eigenvalues of $\hat{R}_i$ that capture, say, 90% of the total energy.

The SSP method can be regarded as a descriptive method. Indeed, it can be noted that $P_i$ captures the description of the i-th location. Yet, the fact that $P_i$ captures only the description of the i-th location, without taking into consideration the descriptions of any of the other locations in the database, is a deficiency. It seems advantageous to base $P_i$ not only the data of the i-th location, but also on the data of the other locations in the database, so as to make the fingerprint as discriminative as possible with respect to the other fingerprints in the database. Two such discriminative methods, each with a different $P_i$, based on different optimization criteria are presented herein.

The Maximum Discrimination Projection MDP method is presented first, yielding the projection matrix that provides maximum discrimination with respect to the other locations in the database.

Following below, $P_i$ denotes the desired projection matrix of the i-th location. The projection of the covariance matrix of the i-th location on the subspace defined by $P_i$ need to be maximized. Yet, to increase its discriminative power, it would also be required that $P_i$ minimizes the sum of projections of the covariance matrices of all the other locations in the database. Mathematically, this can be expressed by the following maximization problem:

$$\max_{P_i} \; \frac{tr\{P_i \hat{R}_i\}}{tr\{P_i \hat{R}_{-i}\}} \qquad (19)$$

where $\hat{R}_{-i}$ is the sum of all the other covariance matrices in the database, excluding the i-th:

$$\hat{R}_{-i} = \sum_{j \neq i} \hat{R}_j \qquad (20)$$

Now, to reduce the computational load—the computational saving will become clear in the sequel—the maximization problem is modified slightly, without affecting the solution, and write it as:

$$\max_{P_i} \; \frac{tr\{P_i \hat{R}_i\}}{tr\{P_i \hat{R}_{-i}\}} = \max_{P_i} \; \frac{tr\{P_i \hat{R}_i\}}{tr\{P_i \hat{R}_T\}} \qquad (21)$$

where $\hat{R}_T$ is given by $$\hat{R}_T = \hat{R}_{-i} + \hat{R}_i = \sum_j \hat{R}_j \qquad (22)$$

From (14) and the properties of the trace operator to rewrite it as $$\max_{W_i} \; \frac{tr\{W_i^H \hat{R}_i W_i\}}{tr\{W_i^H \hat{R}_T W_i\}} \qquad (23)$$

This maximization problem, appearing in linear discriminant analysis and in many other dimensionality reduction problems, and referred to as the trace ratio or trace quotient maximization problem, does not have a closed-form solution. Though several solutions were introduced recently, they are iterative and computationally complex. As a result, the problem is usually replaced by simpler yet related problems. The first, referred to as the ratio trace or quotient trace problem, is given by:

$$\max_{W_i} \, tr\{(W_i^H \hat{R}_T W_i)^{-1} W_i^H \hat{R}_i W_i\} \quad (24)$$

The second, a related and simpler problem, is given by:

$$\max_{W_i} \, tr\{W_i^H \hat{R}_T^{-1} \hat{R}_i W_i\} \quad (25)$$

Yet, even these simpler problems do not have an exact closed form solution. Indeed, the exact solutions to (24) and (25), obeying the orthogonality constraint (15) and hence referred to as orthogonal or Foley-Sammon after their originators, are all based on a multi-step iterative process. A computationally simpler solution to (24) and (25), yet not obeying the orthogonality constraint (15), is given by the dominant eigenvectors of the matrix $\hat{R}_T^{-1}\hat{R}_i$. It should be noted that these eigenvectors are not orthogonal since the matrix $\hat{R}_T^{-1}\hat{R}_i$ is not Hermitian. An orthonormal $\hat{W}_i$ is obtained after fact, given by:

$$\hat{W}_i = \text{ortho}\{\text{eigv}\{\hat{R}_T^{-1}\hat{R}_i\}\} \quad (26)$$

where ortho{A} denotes the orthonormal base of the span of the matrix A. The dimension of $\hat{W}_i$ is determined, as in the SSP method, by the number of large eigenvalues of $\hat{R}_T^{-1}\hat{R}_i$ that capture, say, 90% of the total energy.

Observing (26), it should be clear why the maximization problem in (21) has been modified. Indeed, has the modification not been carried out, it would require the inversion of a different matrix for every location, instead of a common matrix inversion as in (26).

The Maximum Discrimination Transformation (MDT) method is presented herein, yielding the transformation matrix that provides maximum discrimination with respect to the other locations in the database. Using the vec operator, it can be written:

$$tr\{P_i \hat{R}_i\} = \hat{r}_i^H p_i \quad (27)$$

where $\hat{r}_i$ and $p_i$ are the pN-dimensional vectors $$\hat{r}_i^H = \text{vec}(\hat{R}_i^T) \quad (28)$$

$$p_i = \text{vec} P_i \quad (29)$$

Using this notation, we can rewrite the maximization (21) as:

$$\max_{p_i} \frac{\hat{r}_i^H p_i}{\sum_j \hat{r}_j^H p_i} = \max_{p_i} \frac{\hat{r}_i^H p_i}{\text{sum}\{R^H p_i\}} \quad (30)$$

where sum{v} is the sum of the elements of the vector v, and R is a pN×K matrix, with K denoting the number of points in the database, given by:

$$R = [\hat{r}_1, \ldots, \hat{r}_K] \quad (31)$$

To improve the discrimination power of (30), we do the following: (i) eliminate the requirement that $P_i$ must be a projection matrix, and allow it to be an arbitrarily structured matrix, (ii) require that the numerator is $|\hat{r}_i^H p_i|^2$, rather than $\hat{r}_i^H p_i$, and most importantly, (iii) require that the denominator is $\|R^H p_i\|^2$, rather than sum$\{R^H p_i\}$. With these changes, (30) turns into the following minimization problem:

$$\max_{p_i} \frac{|\hat{r}_i^H p_i|^2}{\|R^H p_i\|^2} = \max_{p_i} \frac{p_i^H \hat{r}_i \hat{r}_i^H p_i}{p_i^H R R^H p_i} \quad (32)$$

To solve this maximization problem we rewrite it as:

$$\max_{q_i} \frac{q_i^H u_i u_i^H q_i}{q_i^H q_i} \quad (33)$$

where $$q_i = (RR^H)^{1/2} p_i \quad (34)$$

and $$u_i = (RR^H)^{-1/2} \hat{r}_i \quad (35)$$

The solution of this maximization problem, by the Cauchy-Schwarz inequality, is given by:

$$\hat{q}_i = u_i \quad (36)$$

implying, from (34) and (35), that:

$$\hat{p}_i = (RR^H)^{-1} \hat{r}_i \quad (37)$$

Observing (37) it should be clear why we have modified the maximization problem in (21). Indeed, have the modification not been carried out, it would require the inversion of a different matrix for every location, instead of a common matrix inversion as in (37).

It is interesting to point out that (37) can also be obtained as the solution of the following least-squares problem:

$$\min_{p_i} \|R^H p_i - e_i\|_2^2 \quad (38)$$

where $e_i$ denote a unit vector with all "0" except "1" in the i-th position. Indeed, the solution of (38) is given by:

$$\hat{p}_i = (RR^H)^{-1} R e_i = (RR^H)^{-1} \hat{r}_i \quad (39)$$

which is identical to (37). This identity is not surprising since both criteria are trying to achieve the same objectives, namely a maximum, or unity constraint, at the i-th term, and minimum, or zeros, at all the other terms.

The two discriminative methods described above involve matrix inversion. Matrix inversion is known to be sensitive to "noise" amplification, resulting from the small eigenvalues, which are becoming dominant in the inverted matrix. A common method for coping with this problem is known as diagonal loading or regularization. The cure this method provides is based on the addition of diagonal matrix to the matrix to be inverted.

Applying diagonal loading to the MDP method (26), results with:

$$\hat{W}_i = \text{eigv}\{(\hat{R}_T + \beta I)^{-1} \hat{R}_i\} \quad (40)$$

where I denotes the identity matrix and $\beta$ is a diagonal loading parameter. Similarly, for the MDT method (37), following outcome is:

$$\hat{p}_i = (RR^H + \beta I)^{-1} \hat{r}_i \quad (41)$$

It must be pointed out that there is no closed-form expression for the optimal value of $\beta$.

Following is a discussion regarding the matching of a query covariance matrix $\hat{R}$ with the fingerprints in the database.

The conventional and straightforward solution of the matching problem is to search over the database for the location whose fingerprint best matches the query covariance, with the matching depending on the similarity-metrics defined by the fingerprint extraction methods. We shall refer to this matching rule, with some abuse of terminology, as the Nearest Neighbor (NN) matching criterion.

In the case of the SSP method, the NN matching amounts to searching for the location i that maximizes the metric (16), with $\hat{R}$ substituting for $R_i$, that is $$\max_i \; tr\{\hat{P}_i \hat{R}\} \quad (42)$$

Where $\hat{P}_i$ is given by (18). Similarly, in the case of the MDP method it amounts to maximizing the metric (25), with $\hat{R}$ substituting for $R_i$, that is $$\max_i \; tr\{\hat{P}_i \hat{R}_T^{-1} \hat{R}\} \quad (43)$$

where $\hat{P}_i$ is given by (26), and $\hat{R}_T$ is the matrix defined by (22).

Likewise, in the case of the MDT method it amounts to maximizing the metric (32), with $\hat{R}$ substituting for $R_i$, that is $$\max_i \; \frac{|tr\{\hat{P}_i \hat{R}\}|^2}{\|R^H \text{vec}\hat{P}_i\|^2} \quad (44)$$

where $\text{vec}\hat{P}_i$, and consequently $\hat{P}_i$, is the matrix given by (37), and R is the matrix defined by (31).

NN matching may suffer from ambiguity errors in challenging scenarios. Indeed, in difficult scenarios the similarity metric may yield very close scores for two different locations, and as a result give rise to a high level of ambiguity error. To address this problem, the Similarity-Profile (SP) matching, known in the art, may be used.

The similarity profile of the i-th location, representing the similarity of the i-th location data to the fingerprints in the database, is defined by the 1×K vector $$\hat{s}_i = [\hat{s}_{i1}, \ldots, \hat{s}_{iK}] \quad (45)$$

where $\hat{s}_{ij}$ denotes the similarity of the i-th data to the j-th location fingerprint. The value of $\hat{s}_{ij}$ depends on the fingerprint extraction method.

In the SSP method $\hat{s}_{ij}$ is given by:

$$\hat{s}_{ij} = tr\{\hat{P}_j \tilde{R}_i\} \quad (46)$$

where $\hat{P}_j$ denotes the projection matrix (18), and $\tilde{R}_i$ is the normalized covariance matrix of the i-th location $$\tilde{R}_i = \hat{R}_i / tr\{\hat{R}_i\} \quad (47)$$

Similarly, in the MDT methods $\hat{s}_{ij}$ is given by $$\hat{s}_{ij} = tr\{\hat{P}_j \tilde{R}_i\} \quad (48)$$

wherein $\hat{P}_i$ denotes projection matrix (26), and $\tilde{R}_i$ is modified covariance matrix:

$$\tilde{R}_i = R_T^{-1} \hat{R}_i / tr\{\hat{R}_i\} \quad (49)$$

Likewise, in the MDT method $\hat{s}_{ij}$ is given by $$\hat{s}_{ij} = tr\{\hat{P}_j \tilde{R}_i\} \quad (50)$$

where $\hat{P}_j$ is the transformation matrix given by (37), with an extra normalization introduced to constraint $\hat{p}_j = \text{vec}\hat{P}_j$ to a unit norm, that is $$\hat{p}_j = \rho_j (RR^H)^{-1} \hat{r}_j \quad (51)$$

where $$\rho_j = \text{sqrt}(\hat{r}_j^H (RR^H)^{-2} \hat{r}_j) \quad (52)$$

and $\tilde{R}_i$ is the normalized covariance matrix of the i-th location $$\tilde{R}_i = \hat{R}_i / tr\{\hat{R}_i\} \quad (53)$$

It should be noticed that the covariance matrices $\{\hat{R}_i\}$ have been normalized to eliminate dependence on the power level of the signals between the off-line and on-line phases. According to the SP matching criterion, the localization is carried out by searching over the database for the location whose similarity profile best matches the query similarity profile, obtained from the received signals. That is, $$\hat{i} = \underset{\{location \; i\}}{\text{argmin}} \; \|\hat{s}_i - \hat{s}\|_2^2 \quad (54)$$

wherein $\hat{s}_i$ is the similarity profile of the i-th location, given by (45), and $\hat{s}$ is corresponding query similarity profile, obtained from the captured covariance matrix $\hat{R}$. That is, $$\hat{s} = [\hat{s}_1, \ldots, \hat{s}_K] = [tr\{\hat{P}_1 \hat{R}\}, \ldots, tr\{\hat{P}_K \hat{R}\}] \quad (55)$$

where the values $\hat{P}_j$ and $\hat{R}$ depend on the fingerprint extraction method: for the SSP method $\hat{P}_j$ is given by (18) and $\hat{R}$ is obtained by substituting $\hat{R}$ for $\hat{R}_i$ in (47); for the MDP method $\hat{P}_i$ is given by (26) and $\hat{R}$ is obtained by substituting $\hat{R}$ for $\hat{R}_i$ in (49); and for the MDT method $\hat{P}_j$ is given by (51) and $\hat{R}$ is obtained by substituting $\hat{R}$ for $\hat{R}_i$ in (53).

The discriminating power of the fingerprint extracting methods is captured by the K×K similarity matrix defined by $$\hat{S} = \begin{bmatrix} \hat{s}_1 \\ \vdots \\ \hat{s}_K \end{bmatrix} \quad (56)$$

where $\hat{s}_i$ is given by (45). Notice, from (46), (48) and (50), that the ij-th element of this matrix, $\hat{s}_{ij}$, has the same form in the three methods, given by $$\hat{s}_{ij} = tr\{\hat{P}_j \tilde{R}_i\} = \tilde{r}_i^H \hat{p}_j \quad (57)$$

with $\tilde{R}_i$ and $\hat{P}_j$ depending on the fingerprint extraction method.

Substituting (57) into (56), it can be readily verified that $\hat{S}$ can be expressed by $$\hat{S} = \tilde{R}^H \hat{P} \tag{58}$$

where $\tilde{R}$ is the $(pN)^2 \times K$ matrix $$\tilde{R} = [\tilde{r}_1, \ldots, \tilde{r}_K] \tag{59}$$

and $\hat{P}$ is the $(pN)^2 \times K$ matrix $$\hat{P} = [\hat{p}_1, \ldots, \hat{p}_K] \tag{60}$$

This expression invites inquiring for the matrix $\hat{P}$ that optimizes $\hat{S}$, say, in a least-squares sense. To this end, we need to select an "ideal" similarity matrix. A natural choice is a $K \times K$ diagonal matrix $D$. Indeed, the rows of the "ideal" similarity matrix should be as different as possible from one another, making a diagonal matrix a natural choice. To find the optimal $\hat{P}$, we can therefore formulate the following minimization problem:

$$\min_P \|\tilde{R}^H P - D\|_F^2 \tag{61}$$

The solution, obtained readily by matrix differentiation rules, is given by $$\hat{P} = (\tilde{R}\tilde{R}^H)^{-1}\tilde{R}D \tag{62}$$

The i-th column of $\hat{P}$ is given by $$\hat{p}_i = d_i(\tilde{R}\tilde{R}^H)^{-1}\tilde{r}_i \tag{63}$$

Where $d_i$ is the i-th element of D.

This expression, up to an indeterminacy of the scalar constant, is identical to (36) and (54), implying that the MDT method provides the optimal similarity matrix. It should be pointed out that the optimality of the MDT can also derived from its least-squares formulation given by (38).

The computational load of the SP criterion (54) is of order $K^2$. For large values of K this may be excessive. We will next show, following [6] and [21], how this computational load can be significantly reduced.

To this end, using (57) and (60), we have $$\hat{s}_i = [\tilde{r}_i^H \hat{p}_1, \ldots, \tilde{r}_i^H \hat{p}_K] = \tilde{r}_i^H \hat{P} \tag{64}$$

$$\hat{\tilde{s}}_i = [\tilde{r}^H \hat{p}_1, \ldots, \tilde{r}^H \hat{p}_K] = \tilde{r}_i^H \hat{P} \tag{65}$$

Substituting these expressions in (54), we get $$\|\hat{s}_i - \hat{\tilde{s}}\|_2^2 = \|\tilde{r}_i^H \hat{P} - \hat{\tilde{r}}^H \hat{P}\|_2^2 = (\tilde{r}_i - \hat{\tilde{r}})^H \hat{P}\hat{P}^H(\tilde{r}_i - \hat{\tilde{r}}) \tag{66}$$

Now, denoting by $\hat{G}$ the Cholesky factor of $\hat{P}\hat{P}^H$, $$\hat{P}\hat{P}^H = \hat{G}\hat{G}^H \tag{67}$$

it follows from (67) that we can rewrite (54) as $$\hat{i} = \underset{\{location\ i\}}{\mathrm{argmin}} \|\hat{G}^H(\tilde{r}_i - \tilde{r})\|_2^2 \tag{68}$$

Since $\hat{G}$ is a $(pN)^2 \times (pN)^2$ matrix, as compared to $\hat{P}$ which is $K \times (pN)^2$, (68) provides significant computational saving compared to (54) when $K(pN)^2$.

Note also that, since $\hat{G}^H$ and $\{\tilde{r}_i\}$ are pre-computed in the off-line phase, the on-line computation is rather mild and involves essentially only multiplication of $\hat{G}^H$ with $\hat{\tilde{r}}$, and a search over the data-base for the minimum of (68).

In this section we present simulation results illustrating the performance of the MDP and MDT methods, compared with the SSP method. To simulate a typical indoor propagation environment we used a 3-D electromagnetic simulator and the same environment used in [21]—a 80×80×50 m shopping mall shown in FIG. 1. The system parameters—receiver sensitivity, transmit power and antenna gains—have been set to those typically available in off-the-shelf Wi-Fi equipment. The orange point in the center of the mall denotes the location of the antenna array. The array was a 25 cm diameter uniform circular array, with p=1, p=3 or p=6 omni-directional antennas. To generate the data, emitters were distributed uniformly in the mall area with 0.1 m separation. A sample of the emitter locations is shown by the blue points grid in FIG. 1. The antenna array and the emitters were placed at a height of 2.5 m and 1.5 m, respectively.

The database was built as a rectangular grid with 1 m separation. The test points were selected randomly in the area of the mall, making sure they do not coincide with the database points. The sample-covariance matrices of the database and test points were constructed from snapshots captured in a close vicinity of the database/test point. In order to estimate the covariance matrix a location, the snapshots were chosen randomly from all the snapshots within a 0.6 m radius of the specified location. The exact number of snapshots is specified for each simulation scenario.

The signal used in the simulations was the Long Training Field (LTF) of the preamble of the 802.11a/g/n Wi-Fi packet Error! Reference source not found. [45], which is present in each transmitted packet and is used for channel estimation, accurate frequency offset estimation and time synchronization. The signal-to-noise ratio (SNR) varied from 0 to 60 dB according to the path loss from the emitter location to the base station, and was the same in the database generation and in the tests.

The diagonal loading parameter $\beta$ was set as:

$$\beta = \kappa \epsilon_{1\%} \tag{69}$$

where $\epsilon_{1\%}$ denotes 1% of the energy of the matrix to be inverted, and $\kappa$ is a diagonal loading parameter. The localization performance was evaluated by computing the cumulative distribution function (CDF) of the position location errors, with the position location error defined by the Euclidean distance between the location of the test point and the location of the most likely database grid point selected by the localization algorithm.

Simulation Scenario 1

In this simulation, we compare the performance of the three methods, using both the NN and the SP matching criteria.

The simulation is performed with p=1, p=3 and p=6 antennas and signal bandwidth BW=20 MHz. The number of samples (taps) per antenna is N=8, and the number of snapshots for both the database points and test points is M=65. For the discriminative methods we use a diagonal loading parameter $\kappa$=0.1.

Figure 3:
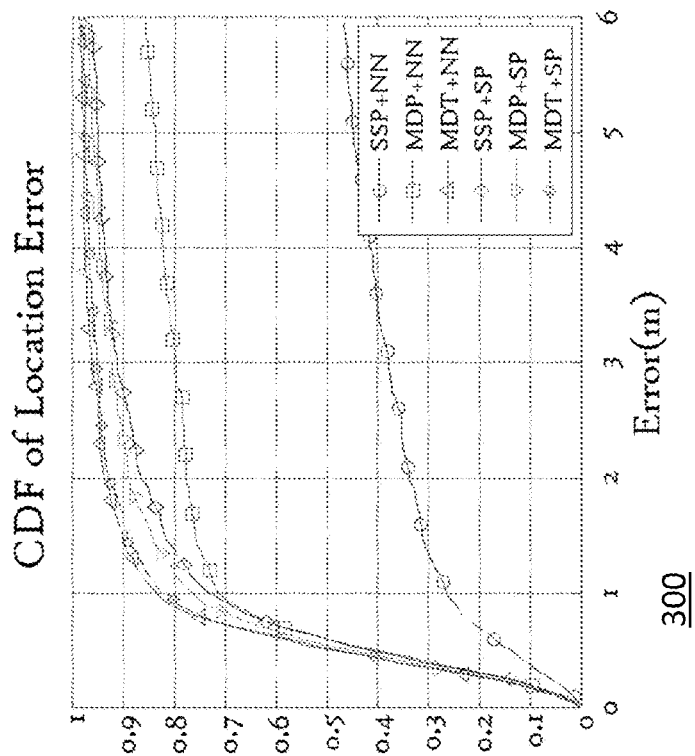
FIGS. 2-11 are graph diagrams illustrating various aspects of experimental data relating to a system according to embodiments of the present invention.
Figure 2:
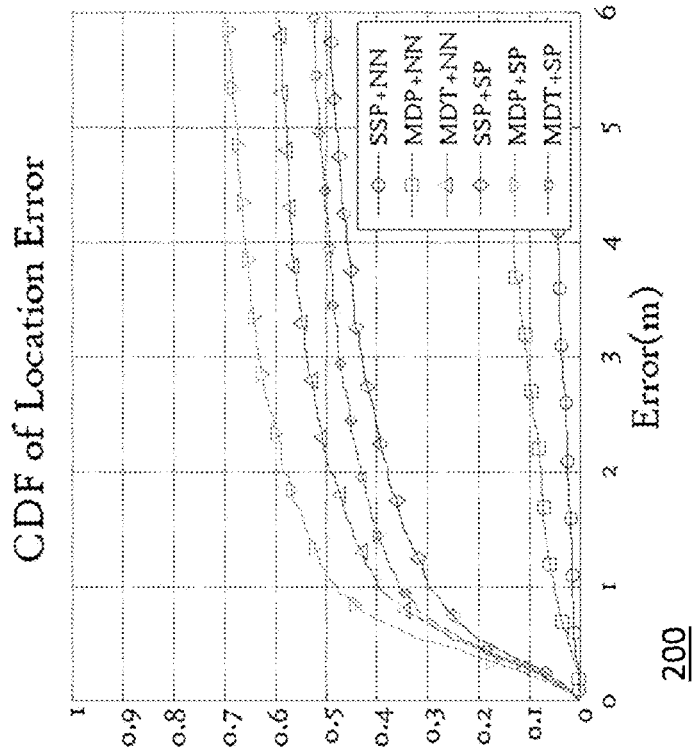
Figure 4:
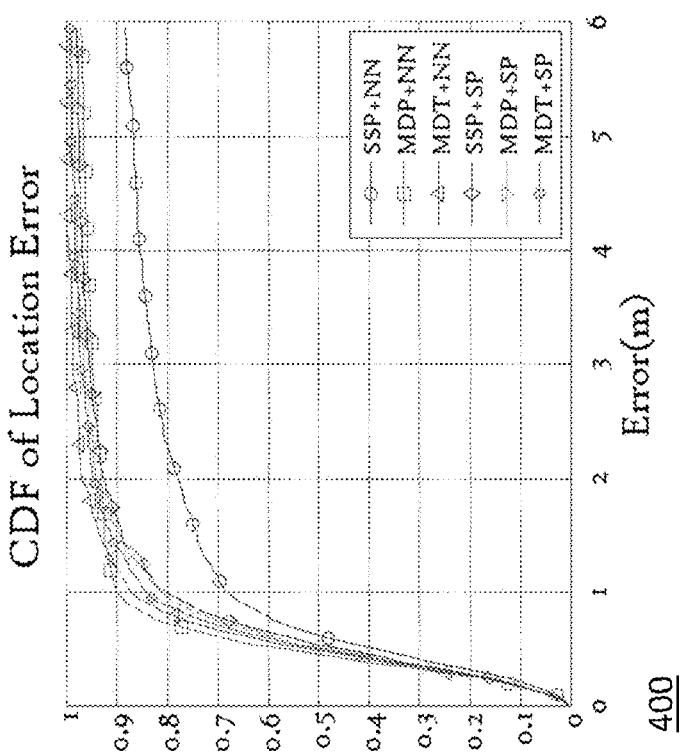

FIG. 2, FIG. 3 and FIG. 4 show the results for p=1, p=3 and p=6, respectively. Clearly, the performance of the discriminative methods is superior to the SSP method, with the performance gain higher in the more challenging cases of p=1 and p=3. Note also that the MDT outperforms the MDP, except in the case of p=1.

Simulation Scenario 2

In this simulation, we compare the performance of the three methods in the case of higher signal bandwidths: BW=40 MHz and BW=80 MHz.

The number of antennas is p=1, the number of taps N=16, the snapshots for both the database points and the test points M=65, and diagonal loading parameter κ=0.1.

Figure 5:
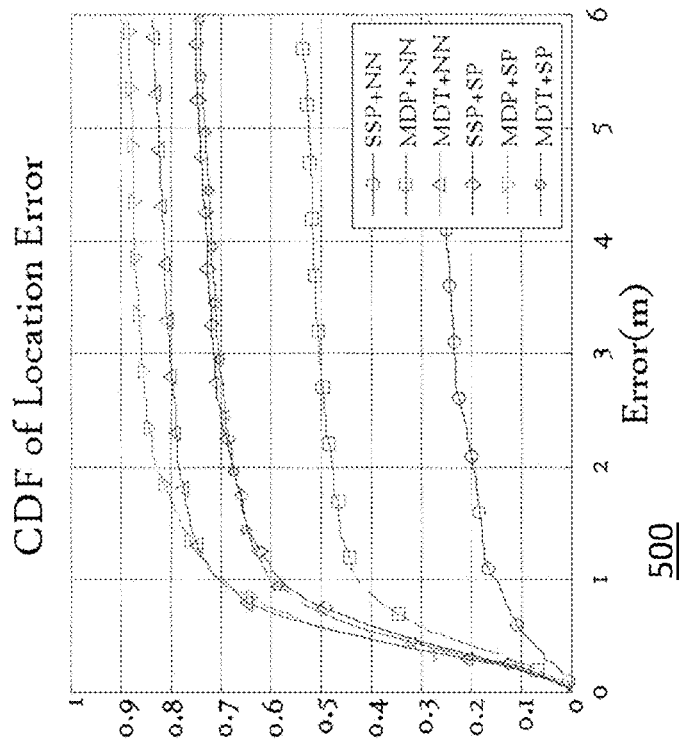
Figure 6:
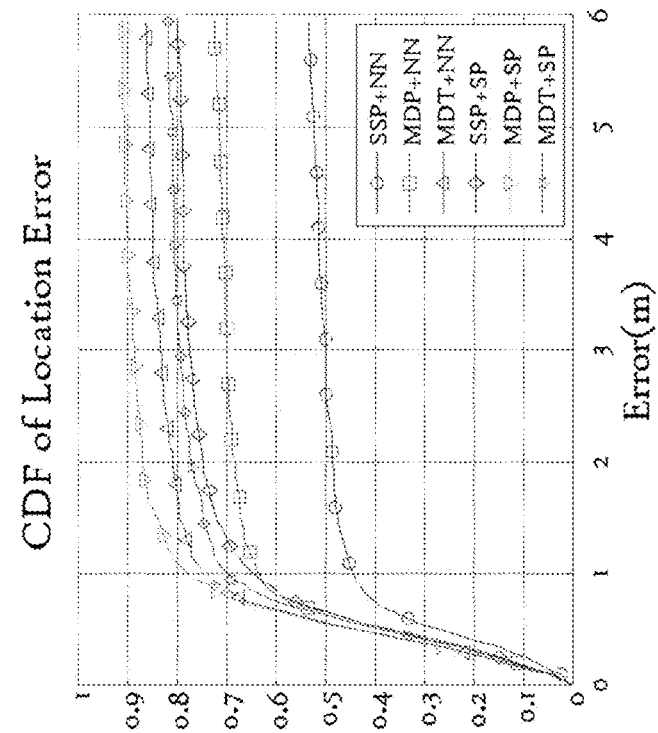

FIG. 5 and FIG. 6 show the results with BW=40 MHz and BW=80 MHz, respectively. Clearly, here as well, the MDP and MDT methods outperform the SSP method. Note that, as expected, the higher bandwidth improves the performance of all methods with respect to the case of BW=20 MHz shown in FIG. 2.

Simulation Scenario 3

In this simulation, we compare the performance of the three methods in the case of small number of snapshots for the test points: M=1, M=5 and M=20. The number of snapshots for the database points is fixed to M=65.

Figure 7:
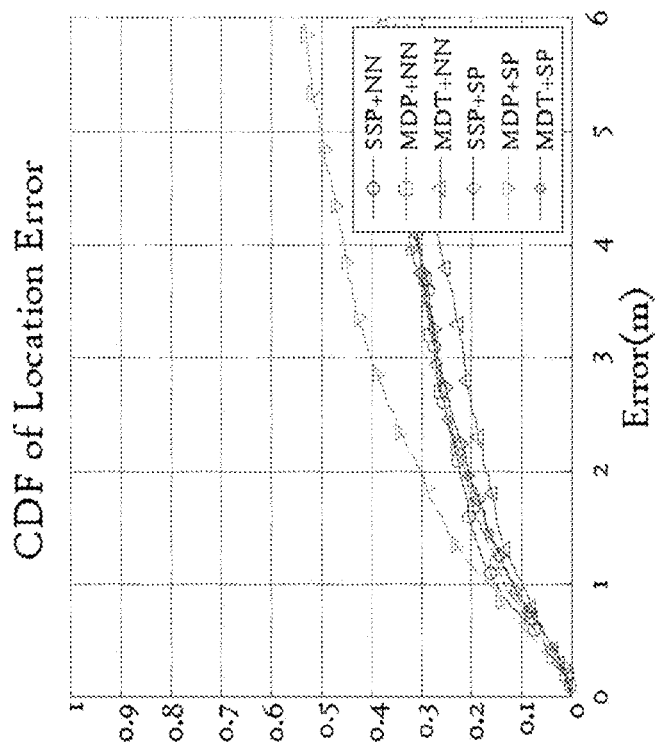
Figure 9:
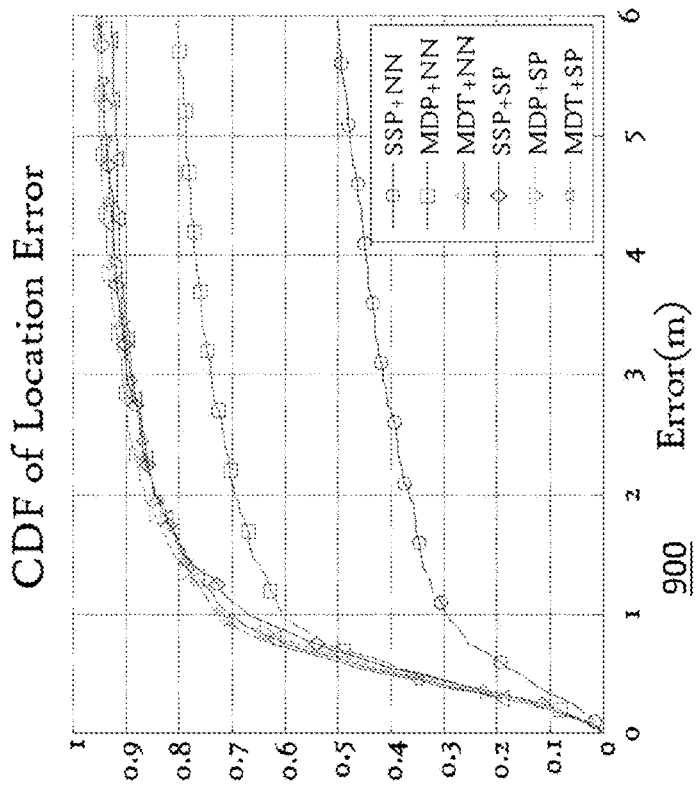
Figure 8:
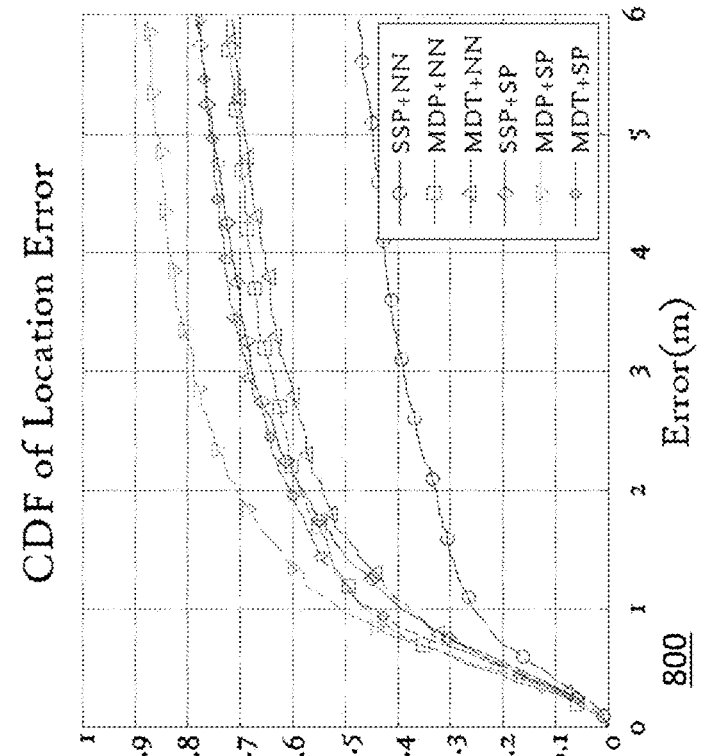

The number of antennas is p=3, number of taps N=8, and the diagonal loading parameter κ=0.1. The signal bandwidth is BW=20 MHz. FIG. 7, FIG. 8 and FIG. 9, show the results for M=1, M=5, and M=20, respectfully. In these cases, as well, the MDP and MDT methods outperform the SSP method. Note that, for a very low number of snapshots, the performance of the MDT method is inferior to the MDP method, but as the number of snapshots increases, the MDT eventually closes the performance gap with the MDP.

Simulation Scenario 4

Figure 11:
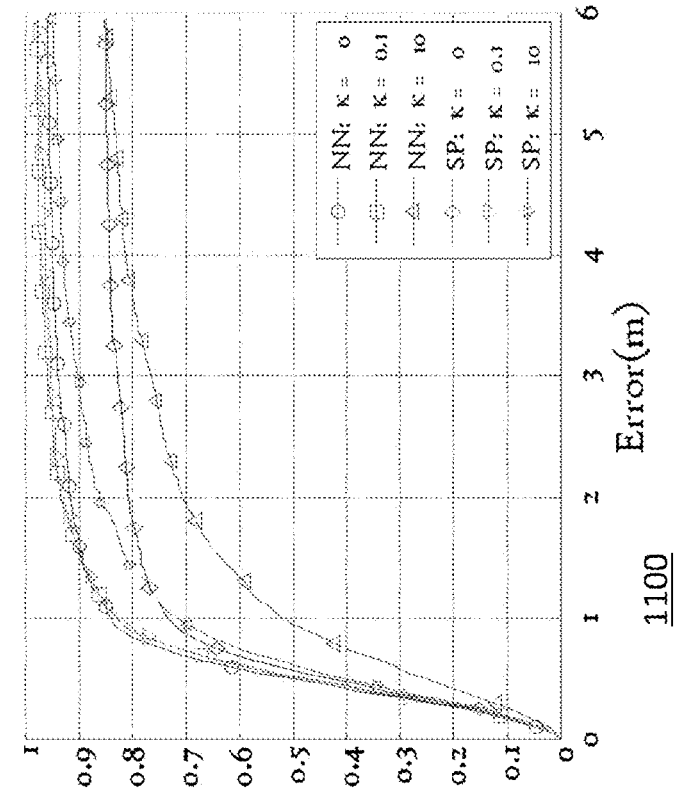
Figure 10:
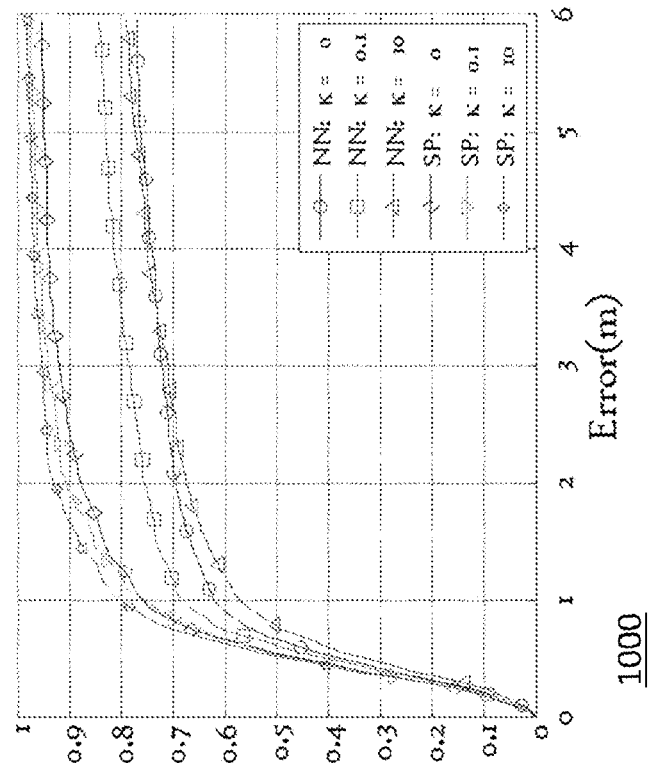

In this simulation, we examine the effect of the diagonal loading on the MDP and MDT methods. To this end we use three values of κ: κ=0, κ=0 0.1, and κ=10. The number of antennas is p=3, number of taps N=8, and number of snapshots for both the database points and test points M=65. The signal bandwidth is BW=20 MHz. FIG. 10 shows the effect of the diagonal loading on the performance of the MDP, while FIG. 11 shows the impact on the MDT method. As can be seen in these figures, the diagonal loading improves the performance, with the value κ=0.1 providing generally the best results.

Real Data Results

In this section, we present experimental results comparing the performance of the MDP and MDT methods with the SSP method.

The experiment was conducted using the same set up as in [21]. The site was the 33 m×33 m×5 m office floor shown in FIG. 12. The BS was an 802.11g Wi-Fi access point (AP) having a uniform circular array, with a diameter of 25 cm and p=6 omni-directional antennas. The antenna array was located at the red dot. The emitter was a laptop communicating with the BS over Wi-Fi. The antenna array was placed at a height of 3 m, and the emitters were placed at a height of 1.5 m. The green square points, separated by 0.5 m, denote locations of database points.

FIG. 11: Performance of the MDT method for different values of diagonal loading. The number of antennas is p=3, number of taps N=8, and number of snapshots M=65 for both database and test points. Signal BW is 20 MHz.

Figure 12:
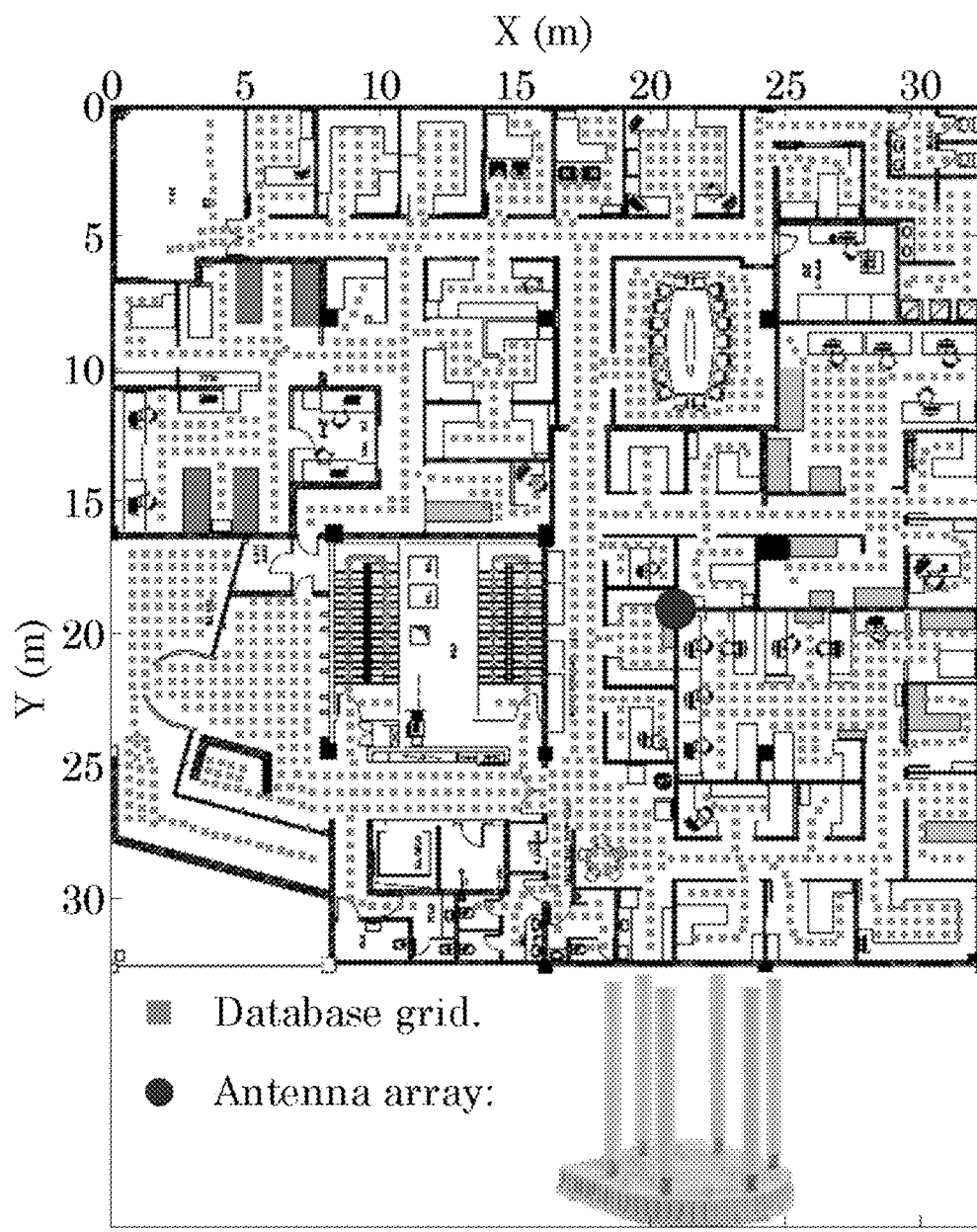
FIG. 12 is a high level block diagram illustrating another aspect of a system according to embodiments of the present invention.

FIG. 12 illustrates the office floor wherein the real data experiment was conducted. The database covariance matrices were built by spatial averaging of the captured data in the vicinity of these points. The test point locations were selected by random shifts from the database points, in a similar way to the simulations. The signal used was the long training field (LTF) of the preamble of the 802.11g Wi-Fi packet [45] with signal bandwidth BW=20 MHz. The diagonal loading for the discriminative methods was κ=0.1.

As seen in FIG. 13, the MDT method outperforms both the MDT and the SSP methods, achieving about the same level of accuracy as that obtained in the simulations.

Two maximum discriminative methods for multipath fingerprinting have been presented herein, enabling single site localization in rich multipath environments. Unlike the existing SSP method, that extracts each fingerprint only from the data of that location, the discriminative methods extract each fingerprint from the data of all the locations in the database, trying to make each fingerprint as different as possible from the other fingerprints. The MDP method extracts the fingerprint by projecting the data on the most discriminative lower dimensional subspace, while the MDT method extracts the fingerprint by transforming the data using the most discriminative transformation.

The performance of both methods was shown to be superior to the existing SSP method, with the MDT method providing over all the best performance, reaching localization accuracy of about 1 m in typical indoor environment.

The performance superiority of the MDT can be attributed to two factors. First, by eliminating the constraint to a projection structure, and by modifying the optimization criterion, we have enabled the MDT method to have higher discrimination power. Second, the MDT method was shown to maximize the discriminating power of the similarity matrix.

Yet, in challenging scenarios, such as single antenna and very low number of snapshots, the performance of MDT method is inferior to that of the MDP method, which shows more robustness in these challenging cases.

As evidenced in the simulation and real data results, the high discriminative power of the MDT method makes the contribution of the SP matching criterion less critical. Using the MDT method with the computationally simpler NN matching criterion is therefore a very plausible alternative, especially when the higher computational load of the SP matching criterion is a problem.

Last, but not least, the maximum discriminative methods, though derived for the special problem of multipath fingerprinting, are novel and general techniques for classification and pattern recognition that are applicable to a wide variety of problems.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of determining a location of a wireless emitter comprising:
    receiving by an antenna array and multi-channel receiver, a signal from the wireless emitter;
    extracting a fingerprint from the signal;
    matching the fingerprint with a fingerprint in a fingerprints database, to identify a matching fingerprint having a best match; and
    selecting as an estimated location of the emitter, a location corresponding to the matching fingerprint,
    wherein the fingerprint database stores fingerprints and corresponding locations, wherein the fingerprints are extracted from wireless signals received by said antenna array, from emitters at known K locations in a geographical coverage region,
    wherein the fingerprint extracted from the received signal is a single coherent entity implicitly including directions-of-arrival and differential-delays information of multipath components of the signal, and wherein the fingerprint is extracted from a spatio-temporal covariance matrix of the received signal,
        wherein a projection of the covariance matrix of an i-th location out of the K locations on the subspace is maximized, and
        wherein the projection of the covariance matrix of the i-th location is calculated so as to minimize a sum of projections of the covariance matrices of part or all of other K−1 locations in the fingerprint database.

2. The method according to claim 1, wherein the fingerprints database is generated in an off-line phase, prior to the receiving, by pre-collecting and storing the fingerprints and the corresponding K locations.

3. The method according to claim 1 wherein the projection of the covariance matrix of an i-th location is defined as $P_i$, wherein $P_i$ is calculated by solving $$\max_{W_i} \; tr\{W_i^H \hat{R}_T^{-1} \hat{R}_i W_i\},$$

wherein $W_i$ is a unitary matrix spanning $P_i$ such that $P_i = W_i W_i^H$ wherein $\hat{R}_i$ is the spatial-temporal covariance matrix of the i-th location.

4. The method according to claim 3, wherein solving is achieved by calculating $\hat{W}_i = \mathrm{ortho}\{\mathrm{eigv}\{\hat{R}_T^{-1} \hat{R}_i\}\}$.

5. A method of determining a location of a wireless emitter comprising:
    receiving by an antenna array and multi-channel receiver, a signal from the wireless emitter;
    extracting a fingerprint from the signal;
    matching the fingerprint with a in a fingerprint database to identify a matching fingerprint having a best match; and selecting as an estimated location of the emitter, a location corresponding to the matching fingerprint, wherein the fingerprint database stores fingerprints and corresponding locations, wherein the fingerprints are extracted from wireless signals received by said antenna array from emitters at known K locations in a geographical coverage region, wherein the fingerprint extracted from the received signal is a single coherent entity implicitly including directions-of-arrival and differential-delays information of multipath components of the signal and wherein the fingerprint is extracted from a spatio-temporal covariance matrix of the received signal, wherein a transformation of the covariance matrix of an i-th location out of the K locations on the subspace is maximized, and wherein the transformation of the covariance matrix of the i-th location is calculated so as to minimize a norm of the covariance matrices of part or all of other K−1 locations in the fingerprint database and allows an arbitrarily structured transformation.

6. The method according to claim 5, wherein the fingerprints database is generated in an off-line phase, prior to the receiving, by pre-collecting and storing the fingerprints and the corresponding K locations.

7. The method according to claim 5, wherein the transformation of the covariance matrix of an i-th location is defined as $P_i$, wherein $P_i$ is calculated by solving:

$$\max_{p_i} \frac{|\hat{r}_i^H p_i|^2}{\|R^H p_i\|^2} = \max_{p_i} \frac{p_i^H \hat{r}_i \hat{r}_i^H p_i}{p_i^H R R^H p_i}.$$

8. The method according to claim 7, wherein a solution for:

$$\max_{p_i} \frac{|\hat{r}_i^H p_i|^2}{\|R^H p_i\|^2} = \max_{p_i} \frac{p_i^H \hat{r}_i \hat{r}_i^H p_i}{p_i^H R R^H p_i}$$

is achieved by reformulating as $$\max_{q_i} \frac{q_i^H u_i u_i^H q_i}{q_i^H q_i},$$

and calculating $\hat{P}_i = (RR^H)^{-1} \hat{r}_i$, wherein $u_i = (RR^H)^{-1/2} \hat{r}_i$ wherein $q_i = (RR^H)^{1/2} p_i$, and wherein $\hat{q}_i = u_i$.

9. A system of determining a location of a wireless emitter comprising:

an antenna array and multi-channel receiver configured to receive a signal from the wireless emitter;

a fingerprint database configured to store fingerprints and corresponding locations, wherein the fingerprints are extracted from wireless signals received by said antenna array, from emitters at known K locations in a geographical coverage region; and a processor configured to: extract a fingerprint from the signal; match the fingerprint with a fingerprint in a fingerprints database, to identify a matching fingerprint having a best match; and select as an estimated location of the emitter, a location corresponding to the matching fingerprint, wherein the fingerprint extracted from the received signal is a single coherent entity implicitly including directions-of-arrival and differential-delays information of multipath components of the signal, and wherein the fingerprint is extracted from a spatio-temporal covariance matrix of the received signal, wherein a projection of the covariance matrix of an i-th location out of the K locations on the subspace is maximized, and wherein the projection of the covariance matrix of the i-th location is calculated so as to minimize a sum of projections of the covariance matrices of part or all of other K−1 locations in the fingerprint database.

10. The system according to claim 9, wherein the fingerprints database is generated in an off-line phase, prior to the receiving, by pre-collecting and storing the fingerprints and the corresponding K locations.

11. The system according to claim 9 wherein the a projection of the covariance matrix of an i-th location is defined as $P_i$, wherein $P_i$ is calculated by solving $$\max_{W_i} tr\{W_i^H \hat{R}_T^{-1} \hat{R}_i W_i\},$$

wherein $W_i$ is a unitary matrix spanning $P_i$ such that $P_i = W_i W_i^H$ wherein $\hat{R}_i$ the spatial-temporal covariance matrix of the i-th location.

12. The system according to claim 11, wherein solving is achieved by calculating $\hat{W}_i = \text{ortho}\{\text{eigv}\{\hat{R}_T^{-1} \hat{R}_i\}\}$.

13. A system of determining a location of a wireless emitter comprising:

an antenna array and multi-channel receiver configured to receive a signal from the wireless emitter;

a fingerprint database configured to store fingerprints and corresponding locations, wherein the fingerprints are extracted from wireless signals received by said antenna array, from emitters at known K locations in a geographical coverage region; and a processor configured to: extract a fingerprint from the signal; match the fingerprint with a fingerprint in a fingerprints database, to identify a matching fingerprint having a best match; and select as an estimated location of the emitter, a location corresponding to the matching fingerprint, wherein the fingerprint extracted from the received signal is a single coherent entity implicitly including directions-of-arrival and differential-delays information of multipath components of the signal and wherein the fingerprint is extracted from a spatio-temporal covariance matrix of the received signal, wherein a transformation of the covariance matrix of an i-th location out of the K locations on the subspace is maximized, and wherein the transformation of the covariance matrix of the i-th location is calculated so as to minimize a norm of the covariance matrices of part or all of other K−1 locations in the fingerprint database and allows an arbitrarily structured transformation.

14. The system according to claim 13, wherein the fingerprints database is generated in an off-line phase, prior to the receiving, by pre-collecting and storing the fingerprints and the corresponding K locations.

15. The system according to claim 13, wherein the transformation of the covariance matrix of an i-th location is defined as $P_i$, wherein $P_i$ is calculated by solving:

$$\max_{p_i} \frac{|\hat{r}_i^H p_i|^2}{\|R^H p_i\|^2} = \max_{p_i} \frac{p_i^H \hat{r}_i \hat{r}_i^H p_i}{p_i^H R R^H p_i}.$$

16. The system according to claim 15, wherein a solution for:

$$\max_{p_i} \frac{|\hat{r}_i^H p_i|^2}{\|R^H p_i\|^2} = \max_{p_i} \frac{p_i^H \hat{r}_i \hat{r}_i^H p_i}{p_i^H R R^H p_i}$$

is achieved by reformulating as:

$$\max_{q_i} \frac{q_i^H u_i u_i^H q_i}{q_i^H q_i},$$

and calculating $\hat{p}_i = (RR^H)^{-1} \hat{r}_i$, wherein $u_i = (RR^H)^{-1/2} \hat{r}_i$ wherein $q_i = (RR^H)^{1/2} p_i$, and wherein $\hat{q}_i = u_i$.

* * * * *